F. R. McGOUGH.
SAFETY DEVICE FOR CRANKING MECHANISM OF INTERNAL COMBUSTION ENGINES.
APPLICATION FILED MAR. 31, 1920.
1,411,500.
Patented Apr. 4, 1922.
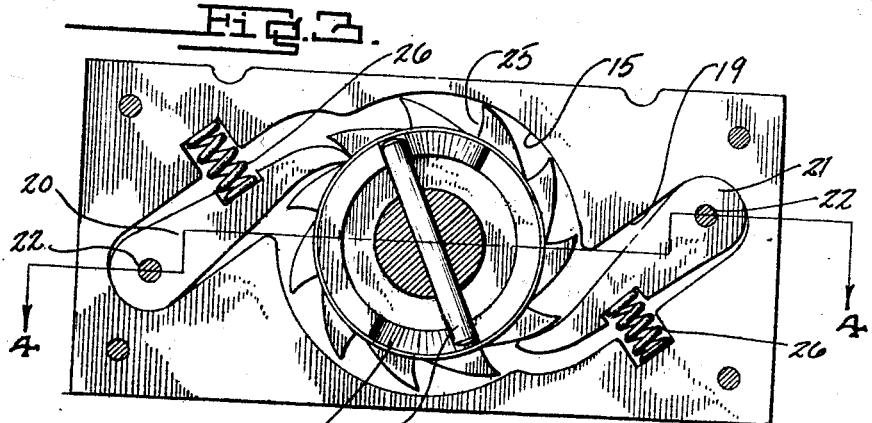
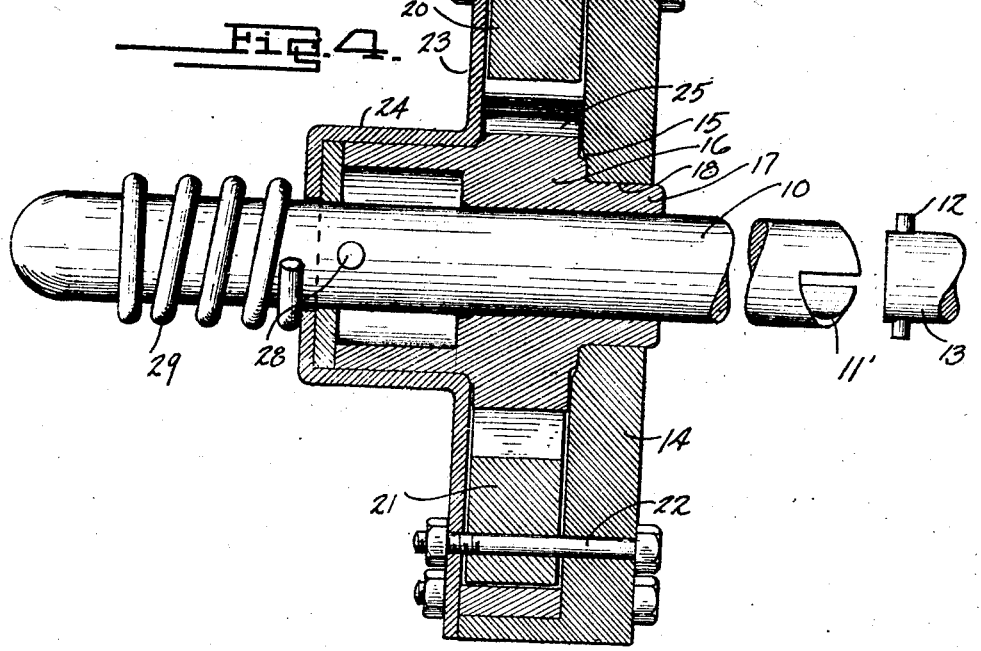
F. R. McGough.
Inventor

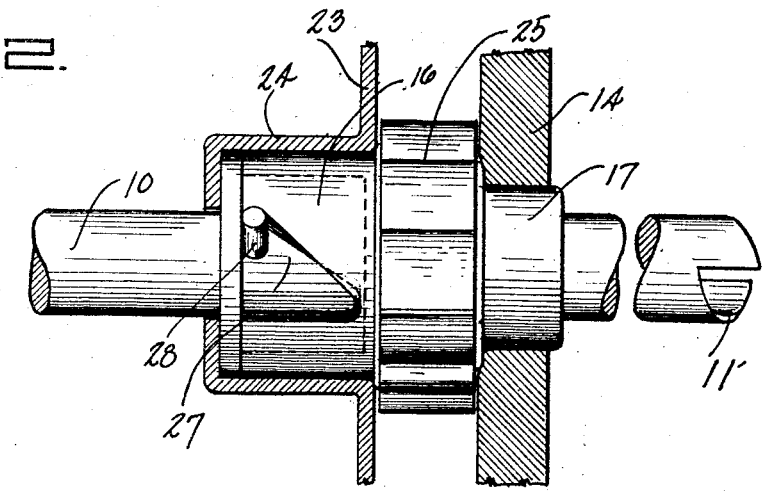
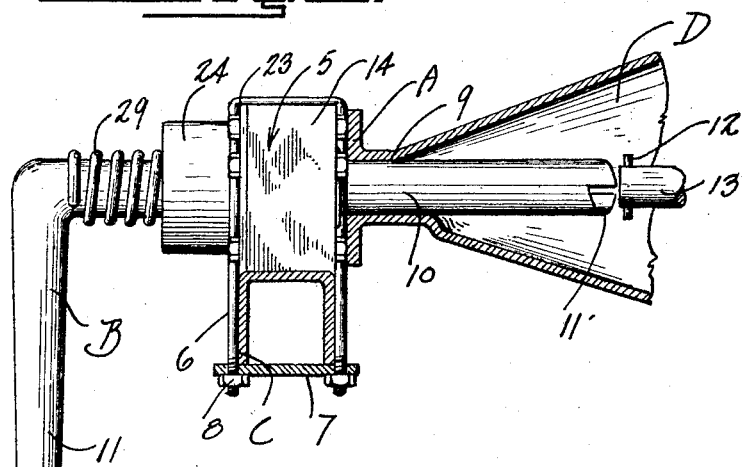

UNITED STATES PATENT OFFICE.

FRANK R. McGOUGH, OF BUTTE, MONTANA.

SAFETY DEVICE FOR CRANKING MECHANISM OF INTERNAL-COMBUSTION ENGINES.

1,411,500.   Specification of Letters Patent.   Patented Apr. 4, 1922.

Application filed March 31, 1920. Serial No. 370,302.

*To all whom it may concern:*

Be it known that I, FRANK R. McGOUGH, a citizen of the United States, residing at Butte, in the county of Silver Bow and State of Montana, have invented certain new and useful Improvements in Safety Devices for Cranking Mechanism of Internal-Combustion Engines, of which the following is a specification.

This invention relates to attachments for motor vehicles, and the primary object of the invention is to provide an improved safety means for cranking internal combustion engines, which is so constructed as to prevent retrograde movement of a crank when the engine back fires, thereby preventing injury to the operator of the engine.

A further object of the invention is to prevent retrograde movement of a starting crank of a motor vehicle so as to prevent injury to the operator of the engine when the same back fires, which is so constructed as to permit a limited movement of the crank so as to permit the disengagement of the cam notches formed in the inner end of the starting crank with the pins carried by the crank shaft of the engine.

A further object of the invention is to provide an improved safety cranking device embodying a frame which can be readily and easily attached to all makes of motor vehicles, and which is so constructed that retrograde movement beyond a certain distance is absolutely eliminated, the means for preventing said movement including a ratchet spool and dogs carried by the attaching frame.

A still further object of the invention is to provide an improved safety cranking device embodying a ratchet spool loosely fitted on the crank having dogs for engaging said spool to prevent retrograde movement thereof, the crank having means formed thereon for engaging said spool so as to permit a limited reverse movement of the crank in relation to the spool.

A still further object of the invention is to provide an improved safety cranking device for internal combustion engines of the above character, which is durable and efficient in use, one that is simple and easy to manufacture, and one which can be placed upon the market at a reasonable cost.

Other objects and advantages of the invention will appear in the following detailed description, taken in connection with the drawings, forming a part of this specification, in which drawings:

Figure 1 is a side elevation of the improved cranking device showing the same attached to a motor vehicle and engine, the engine and motor vehicle being shown in section.

Figure 2 is an enlarged fragmentary vertical section through the improved cranking device.

Figure 3 is an enlarged transverse section through the improved cranking device, and Figure 4 is a horizontal section taken on the line 4—4 of Figure 3.

Referring to the drawings in detail, wherein similar reference characters designate corresponding parts throughout the several views, the letter A indicates a motor vehicle having the improved cranking device B attached thereto. The motor vehicle A includes the front bar C and the engine D. The motor vehicle A may be of the ordinary or any preferred type and the front bar C thereof supports the casing 5 forming a portion of the improved cranking attachment B. The casing 5 is secured to the front bar C by the U-bolts 6, the lower terminals of which are united by a cross plate 7, which engages the lower surface of the bar. The U-bolts 6 have threaded on their terminals the nuts 8 which engage the lower surface of the cross plate 7. The crank case of the internal combustion engine supports a bearing 9, in which is rotatably supported the horizontal portion 10 of the crank 11, the inner end of which is provided with the cam notches 11' for the reception of the radially extending pins 12 carried by the crank shaft 13 of the engine.

The improved safety cranking device includes the crank 11 which is rotatably mounted in the casing 5, which, as stated, is secured to the front axle C by the U-bolts 6. The casing 5 includes the relatively thick plate 14, formed of metal or the like, one face of which is provided with a substantially circular notch 15, in which is rotatably mounted the spool 16. The spool 16 rotatably receives the horizontal portion 10 of the crank 11 and is provided with a reduced extension 17, which is rotatably mounted in an opening 18 formed in the plate 14 which is arranged in concentric relation to the circular notch 15. The circular notch 15 has communicated therewith at diametrically spaced points oppositely extending tangentially disposed notches 19 which form houses for the pawls 20 and 21 the purpose of which will be hereinafter more fully described. The pawls 20 and 21 are pivotally mounted in the notches on suitable pivot pins 22. The front end of the plate 14 has bolted or otherwise secured thereto the cover plate 23, which carries the central enlargement 24 for the reception of the forward end of the spool 16 which projects beyond the notch 15 formed in the relatively thick plate 14. The spool 16 intermediate its ends is provided with ratchet teeth 25, which are adapted to be engaged by the oppositely disposed pawls 21 and 20. The dogs or pawls 20 and 21 are normally urged into engagement with the ratchet teeth by the expansion springs 26. These dogs or pawls 20 and 21 prevent retrograde or counter clockwise movement of the spool 16, and when the crank 10 is connected thereto, injury is prevented to the driver of the vehicle when cranking the engine when the same backfires.

To connect the crank 11 with the spool 16, the forward end thereof is provided with diametrically opposed inclined or curved slots 27 in which is adapted to engage the diametrically extending pin 28 carried by the horizontal portion 10 of the crank 11. The inner bore of the spool 16 is enlarged at this point as clearly shown in Figure 4 of the drawings. A coil spring 29 is arranged around the crank and normally holds the same in a projected position so that the cam slots 11' formed on the inner end of the crank 11 will normally lie out of engagement with the pins 12. The pins 28 will normally lie at the outer end of the slots 27 and when the crank 11 is pushed inwardly into operative position, the pins 28 will ride to the inner ends of the cam slots.

If the engine backfires, the dogs 20 and 21 will prevent retrograde movement of the crank and thereby prevent injury to the driver of the vehicle. If the engine backfires the crank 11 will move a slight distance permitted by the inclined face of the cam slots 27, which is sufficient to allow the disengagement of the crank with the crank shaft. The slots 27 permit the slight forward movement of the crank so as to permit and facilitate the disengagement of the cam notches 11' with the pins 12 on the crank shaft 13 which is necessary and desirable. While the device is shown connected to the cross bar of the chassis of a motor vehicle, it is to be understood that the same can be connected at any point on the vehicle or engine according to the make of the vehicle with which the same is used and the housing and attaching elements changed accordingly.

From the foregoing description it can be seen that an improved means is provided which will effectively safeguard the operator of a motor vehicle during the cranking of the engine and which is so constructed as to present a pleasing appearance to the machine and not detract from the looks thereof.

Changes in details may be made without departing from the spirit or scope of the invention; but,

I claim:

The combination with an engine shaft, a starting shaft aligned therewith adapted to be brought into and out of operative engagement with the engine shaft, of a safety device for the starting shaft including a block having a circular recess formed in one face, and an opening arranged in concentric relation to the recess, a spool rotatably mounted in the recess, a reduced extension formed on the spool and rotatably fitted in said opening, the block having tangentially extending notches formed therein, dogs pivotally mounted in the notches, ratchet teeth formed on the spool, spring means normally urging the dogs into engagement with the ratchet teeth, a plate detachably secured to the block and arranged to overlie said recesses and notches and rotatably support the spool, the forward end of the spool having inwardly extending cam notches formed therein, and outwardly extending pins carried by the starting shaft arranged to rest in said notches.

FRANK R. McGOUGH.